US009912827B2

(12) United States Patent
Nakahara

(10) Patent No.: US 9,912,827 B2
(45) Date of Patent: Mar. 6, 2018

(54) INFORMATION PROCESSING APPARATUS FOR MANAGING SETTING VALUES OF CLIENT DEVICE, METHOD OF CONTROLLING THE SAME, AND STORAGE MEDIUM

(71) Applicant: CANON KABUSHIKI KAISHA, Tokyo (JP)

(72) Inventor: Hidetaka Nakahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/953,530

(22) Filed: Nov. 30, 2015

(65) Prior Publication Data

US 2016/0173714 A1    Jun. 16, 2016

(30) Foreign Application Priority Data

Dec. 11, 2014   (JP) ................................. 2014-251073

(51) Int. Cl.
*G06F 3/12* (2006.01)
*H04N 1/00* (2006.01)
*G06K 15/00* (2006.01)

(52) U.S. Cl.
CPC ....... *H04N 1/00973* (2013.01); *H04N 1/0097* (2013.01); *H04N 1/00244* (2013.01);
(Continued)

(58) Field of Classification Search
CPC ........... H04N 1/00973; H04N 1/00244; H04N 1/00344; H04N 1/00482; H04N 1/0097;
(Continued)

(56) References Cited

U.S. PATENT DOCUMENTS 6,374,262 B1* 4/2002 Kodama ........... G06F 17/30575
707/623
2009/0313541 A1* 12/2009 Dan ...................... G06F 3/1207
715/273
(Continued)

FOREIGN PATENT DOCUMENTS

JP 2000339156 A 12/2000
JP 2008176616 A 7/2008

*Primary Examiner* — Gabriel Garcia
(74) *Attorney, Agent, or Firm* — Rossi, Kimms & McDowell LLP

(57) ABSTRACT

An information processing apparatus stores, in association with configuration information of an image processing apparatus, specification information used to determine settings information that is used for an operation of the image processing apparatus and is to be shared between the information processing apparatus and the image processing apparatus, obtains the configuration information of the image processing apparatus receives, in a case where specification information corresponding to the configuration information that the obtaining unit obtained is not stored in the storage unit, the specification information corresponding to the obtained configuration information from an external storage device, and transmits to the image processing apparatus settings information to be shared with the image processing apparatus, which is determined based on the specification information received from the external storage device among the settings information stored by the storage unit.

13 Claims, 10 Drawing Sheets

(52) U.S. Cl.
CPC ..... *H04N 1/00344* (2013.01); *H04N 1/00482* (2013.01); *H04N 2201/0094* (2013.01)

(58) Field of Classification Search
CPC .......... H04N 2201/0094; G06F 3/1231; G06F 3/1205
USPC ................ 358/1.1, 1.13–1.18, 474; 715/273; 709/223
See application file for complete search history.

(56) References Cited

U.S. PATENT DOCUMENTS

| | | | |
|---|---|---|---|
| 2010/0033759 A1* | 2/2010 | Motokado | G06F 3/1205 358/1.15 |
| 2012/0320415 A1* | 12/2012 | Nakamura | G06K 15/02 358/1.15 |
| 2015/0189116 A1* | 7/2015 | Ito | H04N 1/00973 358/1.13 |
| 2016/0173714 A1* | 6/2016 | Nakahara | H04N 1/00973 358/1.13 |

* cited by examiner

INFORMATION PROCESSING APPARATUS FOR MANAGING SETTING VALUES OF CLIENT DEVICE, METHOD OF CONTROLLING THE SAME, AND STORAGE MEDIUM

BACKGROUND OF THE INVENTION

Field of the Invention

The following embodiments relate to an information processing apparatus, a method of controlling the same, and a storage medium.

Description of the Related Art

In recent years, in relation to a setting value of a multi-function peripheral or the like, it has become necessary to edit the setting on an external apparatus such as a server and generate data. A service in which settings held on a server are used in real-time by a client is provided by managing them on the server in a centralized fashion and by the client, which is connected to the server by a network, synchronizing its data. Settings data edited on the server is saved in a format in which it can be imported by the client, and by using this, it is possible for a customer who performs an initial installation of a multi-function peripheral to immediately import and be able to use desired settings data.

When performing such an operation, it is essential that an application exists on the server that can edit settings information of the corresponding client. However, if clients are multi-function peripherals, it is typical for a setting value specification to be different for each model, and for the setting value specification or the existence/absence of an item linked to the firmware version to differ even for those of the same model. To create an editing application on the server that considers specification of setting values that has variation in this way, it is necessary to acquire and use the setting value specifications of the target firmware versions and models. In addition, each time a new model is launched on the market or a new version of firmware is published, it is necessary to obtain a setting value specification that tracks this.

Japanese Patent Laid-Open No. 2008-176616 proposed an application on a server obtaining content such as an image from a separate storage server as necessary. Japanese Patent Laid-Open No. 2000-339156 proposed an application obtained from a server querying a separate license server as to whether it usage is possible on an information processing apparatus.

However, the prior art is simply obtaining saved content or performing a query to confirm a license—it does not envision editing a setting. To edit a setting, it is necessary to manage data that defines a setting value specification linked to a firmware version and model of an editing target the information processing apparatus, and furthermore an arrangement by which a setting value editing application obtains this information at a timing at which it is required is necessary.

In addition, it is not efficient to consolidate and manage information for many models or versions on a server. Maintenance would be required each time the number of models or versions increases, and an amount of information would also increase. For instance, in the case of an embodiment in which a client transmits information to a server, a storage capacity of a device would be excessively consumed, and a storage-less configuration is not possible.

SUMMARY OF THE INVENTION

The present invention enables realization of an arrangement that, by suitably managing setting values of a client or the like and also by using that managed information, performs editing of the setting value or the like of the client from a corresponding server.

One aspect of the present invention provides an information processing apparatus comprising: a storage unit configured to store, in association with configuration information of an image processing apparatus, specification information used to determine settings information that is used for an operation of the image processing apparatus and is to be shared between the information processing apparatus and the image processing apparatus; an obtaining unit configured to obtain the configuration information of the image processing apparatus; a receiving unit configured to receive, in a case where specification information corresponding to the configuration information that the obtaining unit obtained is not stored in the storage unit, the specification information corresponding to the obtained configuration information from an external storage device; and a transmission unit configured to transmit to the image processing apparatus settings information to be shared with the image processing apparatus, which is determined based on the specification information received from the external storage device among the settings information stored by the storage unit.

Another aspect of the present invention provides a method for controlling an information processing apparatus, the method comprising: storing in a storage unit, in association with configuration information of an image processing apparatus, specification information used to determine settings information that is used for an operation of the image processing apparatus and is to be shared between the information processing apparatus and the image processing apparatus; obtaining the configuration information of the image processing apparatus; receiving, in a case where specification information corresponding to the obtained configuration information is not stored in the storage unit, the specification information corresponding to the obtained configuration information from an external storage device; and transmitting to the image processing apparatus settings information to be shared with the image processing apparatus, which is determined based on the specification information received from the external storage device among the settings information stored by the storage unit.

Still another aspect of the present invention provides a non-transitory computer readable storage medium storing a program for causing a computer to execute a method, the method comprising: storing in a storage unit, in association with configuration information of an image processing apparatus, specification information used to determine settings information that is used for an operation of the image processing apparatus and is to be shared between the computer and the image processing apparatus; obtaining the configuration information of the image processing apparatus; receiving, in a case where specification information corresponding to the obtained configuration information is not stored in the storage unit, the specification information corresponding to the obtained configuration information from an external storage device; and transmitting to the image processing apparatus settings information to be shared with the image processing apparatus, which is determined based on the specification information received from the external storage device among the settings information stored by the storage unit.

Further features of the present invention will become apparent from the following description of exemplary embodiments (with reference to the attached drawings).

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Configuration>

Explanation is given below with reference to FIG. 1 through FIG. 8 of a first embodiment of the present invention. Firstly, with reference to FIG. 1, explanation is given for an overall configuration of a setting value synchronization system of the present invention. A network 100 is connected to a setting value management server (an information processing apparatus) 110, a plurality of multi-function peripherals (image processing apparatuses) 120a and 120b, a setting value specification management server (an external apparatus) 130, and a client PC 140.

The setting value management server 110 manages settings data of the multifunction peripherals 120a,b; and has a function that can reflect the settings data held on the server to the multifunction peripherals 120a,b. The setting value specification management server 130 holds a DB that manages specifications of setting values of the multifunction peripherals 120a,b that are linked to models and firmware versions of the multifunction peripherals 120a,b. The setting value management server 110 can access the DB, obtain this information, and generate a setting value editing screen.

Detailed configurations of the setting value management server 110, the multifunction peripherals 120a,b, and the setting value specification management server 130 are explained later. In addition, the setting value management server 110 is equipped with a Web application, and it is possible to edit data that the setting value management server 110 has by accessing from a client PC 140 by a browser or the like.

<Setting Value Management Server Configuration>

Figure 1:
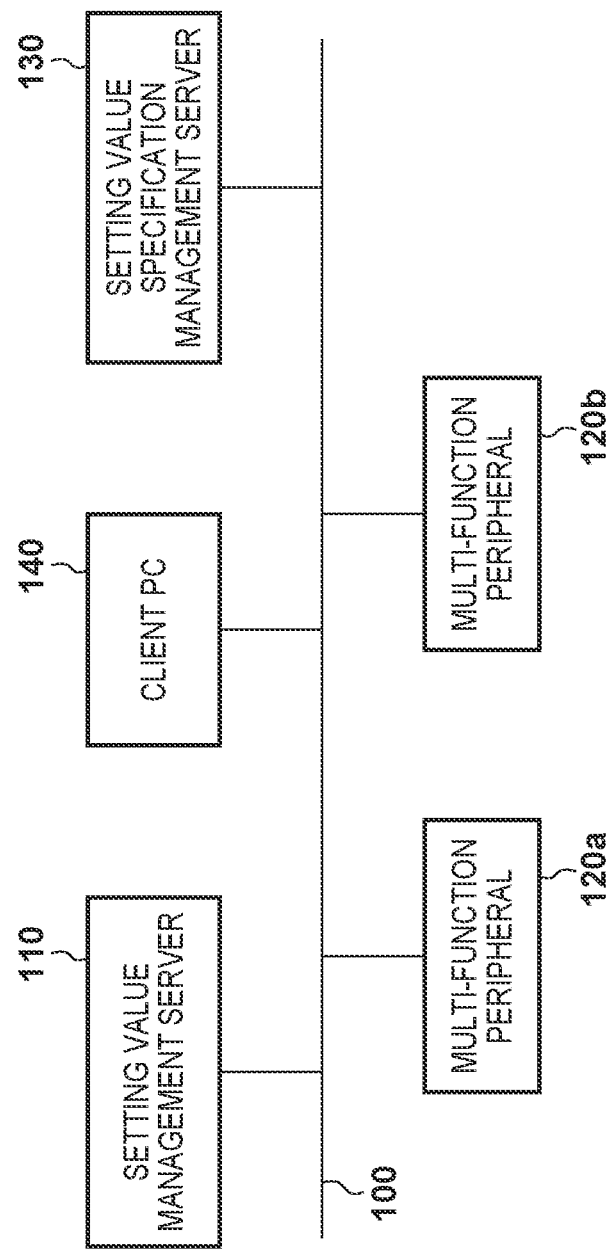
FIG. 1 is a view for illustrating an overall configuration of a setting value synchronization system.
Figure 2:
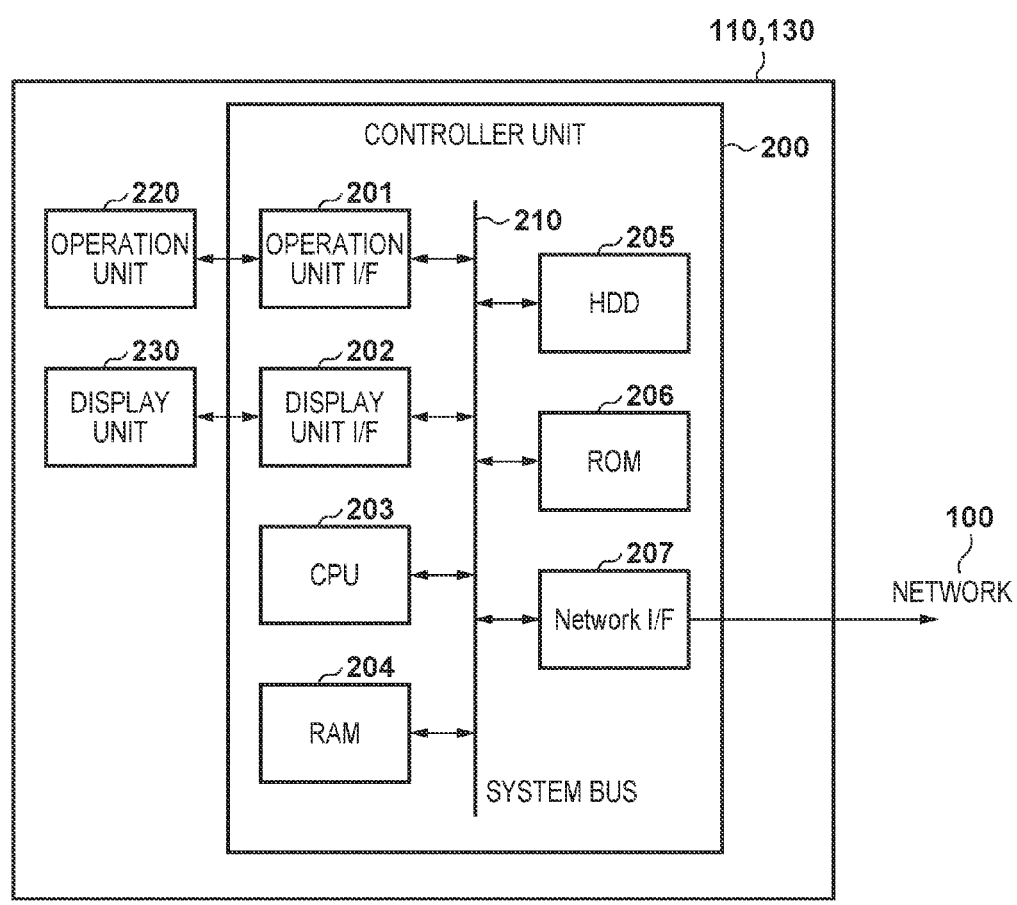
FIG. 2 is a block diagram for illustrating a configuration of a setting value management server and a setting value specification management server.

Next, with reference to FIG. 2, explanation is given for configuration of the setting value specification management server 130 and the setting value management server 110 according to the present embodiment. The setting value management server 110 and the setting value specification management server 130 comprise a controller unit 200, an operation unit 220, and a display unit 230. The controller unit 200 is provided with a CPU 203, an operation unit I/F 201, a display unit I/F 202, a RAM 204, an HDD 205, a ROM 206, and a network I/F 207.

The CPU 203 (Central Processing Unit) starts an OS (Operating System) via a boot program stored in the ROM (Read Only Memory) 206. The CPU 203, through the OS, executes application programs stored in the HDD (Hard Disk Drive) 205, and thereby executes various processing. The RAM (Random Access Memory) 204 is used as a work area for the CPU 203.

The HDD 205 stores information, such as master data of setting values of the multifunction peripherals 120a, 120b, which is included in the above-described application programs and the network 100. Detail regarding a management approach for the master data is described later. Furthermore, as well as the ROM 206 and the RAM 204, the operation unit I/F 201, the display unit I/F 202, and the network I/F 207 are connected to the CPU 203 via a system bus 210. The operation unit I/F 201 is an interface for the operation unit 220 which comprises a mouse, keyboard, or the like, and the operation unit I/F 201 sends information that is input by a user through the operation unit 220 to the CPU 203. The display unit I/F 202 outputs image data to be displayed on the display unit 230, which comprises a display or the like, to the display unit 230. The network I/F 207 is connected to the network 100, and performs input and output of information with apparatuses on the network 100 via the network 100.

<Multi-Function Peripheral Configuration>

Figure 3:
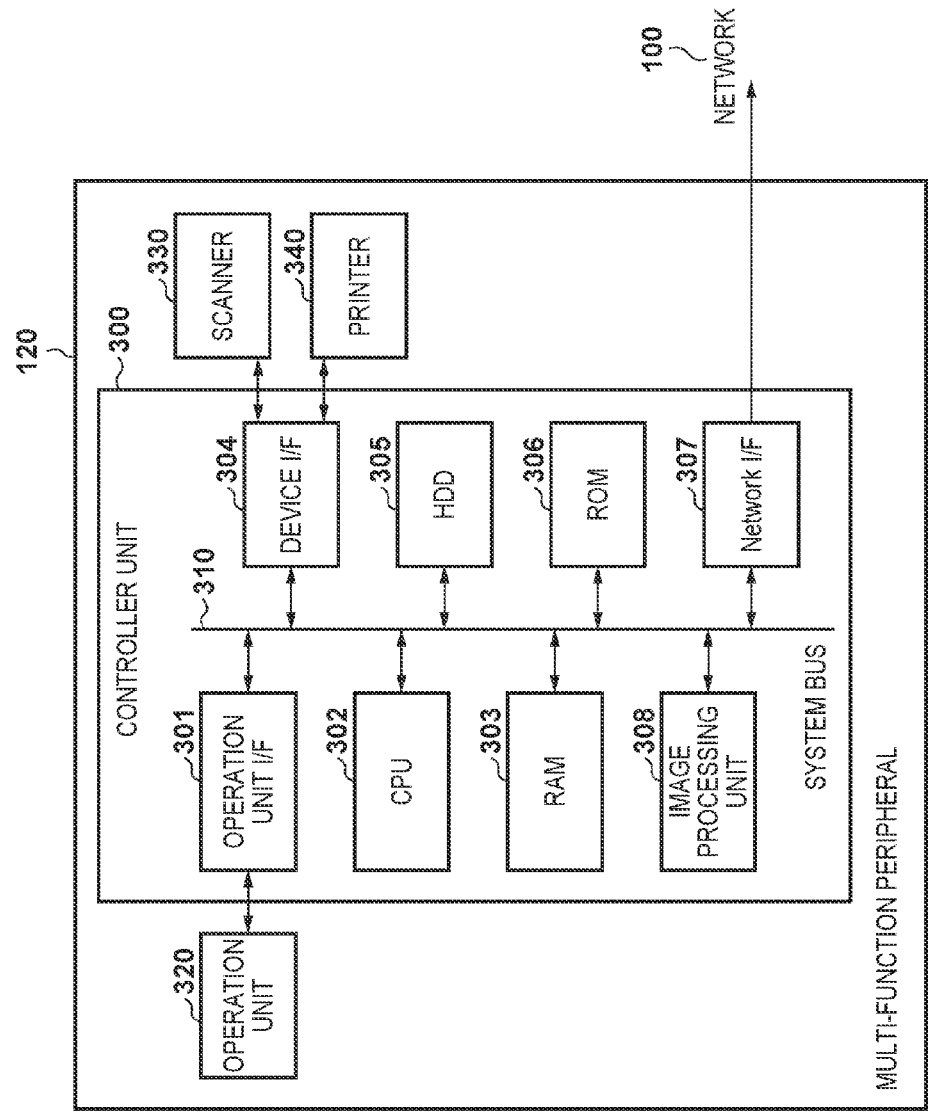
FIG. 3 is a block diagram for illustrating a configuration of a multi-function peripheral.

Next, with reference to FIG. 3, explanation is given for a configuration of the multifunction peripherals 120a,b, which are image processing apparatuses according to the present embodiment. Each of the multifunction peripherals 120a,b is provided with a controller unit 300, an operation unit 320, a scanner 330, and a printer 340. The controller unit 300 is connected to the operation unit 320, and is also connected to the scanner 330, which is an image input device, and the printer 340, which is an image output device. The controller unit 300 is also provided with an operation unit I/F 301, a CPU 302, a RAM 303, a device I/F 304, an HDD 305, a ROM 306, a network I/F 307, and an image processing unit 308.

The CPU (Central Processing Unit) 302 starts an OS (Operating System) via a boot program stored in the ROM (Read Only Memory) 306. The CPU 302, through the OS, executes application programs stored in the HDD (Hard Disk Drive) 305, and thereby executes various processing. The RAM (Random Access Memory) 303 is used as a work area for the CPU 302. The RAM 303 provides a work area and also provides an image memory region for temporarily storing image data. The HDD 305 stores the above-described the application programs, the image data, and various settings values. A setting value management approach in the multifunction peripherals 120a,b is described later.

Furthermore, as well as the ROM 306 and the RAM 303, the operation unit I/F 301, the device I/F 304, the network I/F 307, and the image processing unit 308 are connected to the CPU 302 via a system bus 310. The operation unit I/F 301 is an interface for the operation unit 320, which has a touch panel, and the operation unit I/F 301 outputs image data to be displayed on the operation unit 320 to the operation unit 320. The operation unit I/F 301 sends information input by the user through the operation unit 320 to the CPU 302. Connected to the device I/F 304 are the scanner 330 and the printer 340, and the device I/F 304 performs conversion between a synchronous system and an asynchronous system of image data. The network I/F 307 is connected to the network 100, and performs input and output of information with each apparatus on the network 100 via the network 100. The image processing unit 308 performs processing of an image input from the scanner 330, processing of an image output to the printer 340, and processing such as an image rotation, an image compression, a resolution conversion, color space conversion, gray-level transformation, or the like.

<Setting Value Management Data>

Figure 4:
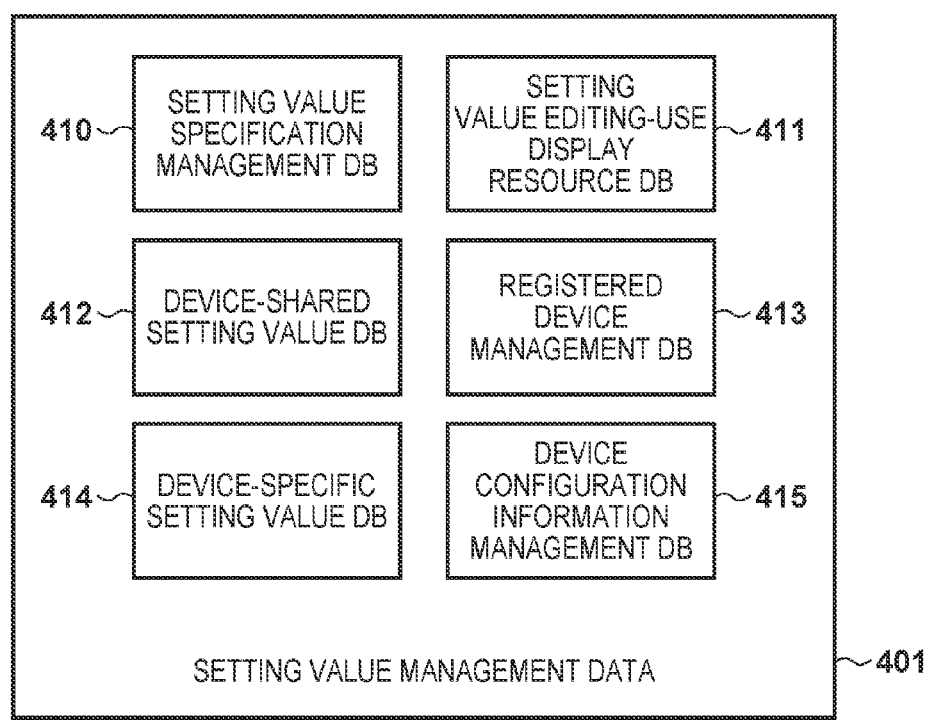
FIG. 4 is a view for illustrating an internal image of a data group that the setting value management server holds.

Next, referring to FIG. 4, explanation is given for setting value management data managed by the setting value management server 110 according to the present embodiment. Setting value management data 401 comprises a setting value specification management DB 410, a setting value editing-use display resource DB 411, a device-shared setting value DB 412, a registered device management DB 413, a device-specific setting value DB 414, and a device configuration information management DB 415. The device-shared setting value DB 412 holds setting values that are shared by a plurality of devices. The registered device management DB 413 manages registered devices. The device-specific setting value DB 414 holds data used by specific devices. The device configuration information management DB 415 manages configuration information of specific devices.

By virtue of the present embodiment, the setting value management server 110 synchronizes a setting value of a multi-function peripheral in real-time. More specifically, when there is a change in the setting value management data 401 stored in advance, the setting value management server 110 notifies the change information to the multifunction peripherals 120*a,b* via the network 100. When the change information for a setting value is received from the multi-function peripherals 120*a,b*, a value of the setting value management data 401 of the setting value management server 110 is changed.

The multifunction peripherals 120*a,b* are devices that realize a plurality of kinds of functions (copying, FAX, or the like), and store setting values to be used when executing these functions internally. When setting values are changed, the multi-function peripheral notifies the change information to the setting value management server 110 via the network 100. In addition, when change information of the setting value management data 401, which has been changed on the setting value management server 110, is received, a change is made to the new setting value. Note that, depending on the setting value, there exist those for which synchronization of the value is performed between a plurality of multi-function peripherals, such as between the multifunction peripheral 120*a* and the multifunction peripheral 120*b*. In regard to these setting values, if there is a change in the setting value management data 401 on the setting value management server 110, the setting value management server 110 notifies the change information of the setting values to both of the multifunction peripherals 120*a,b*. When there is a change to a setting value on either of the multifunction peripherals 120*a,b*, initially change information is notified to the setting value management server 110, and thereafter, the change information is also notified to the other the multi-function peripheral via the setting value management server 110. In synchronization control, information of the setting value specification management server 130 is updated as necessary.

<Software Configuration>

Figure 5:
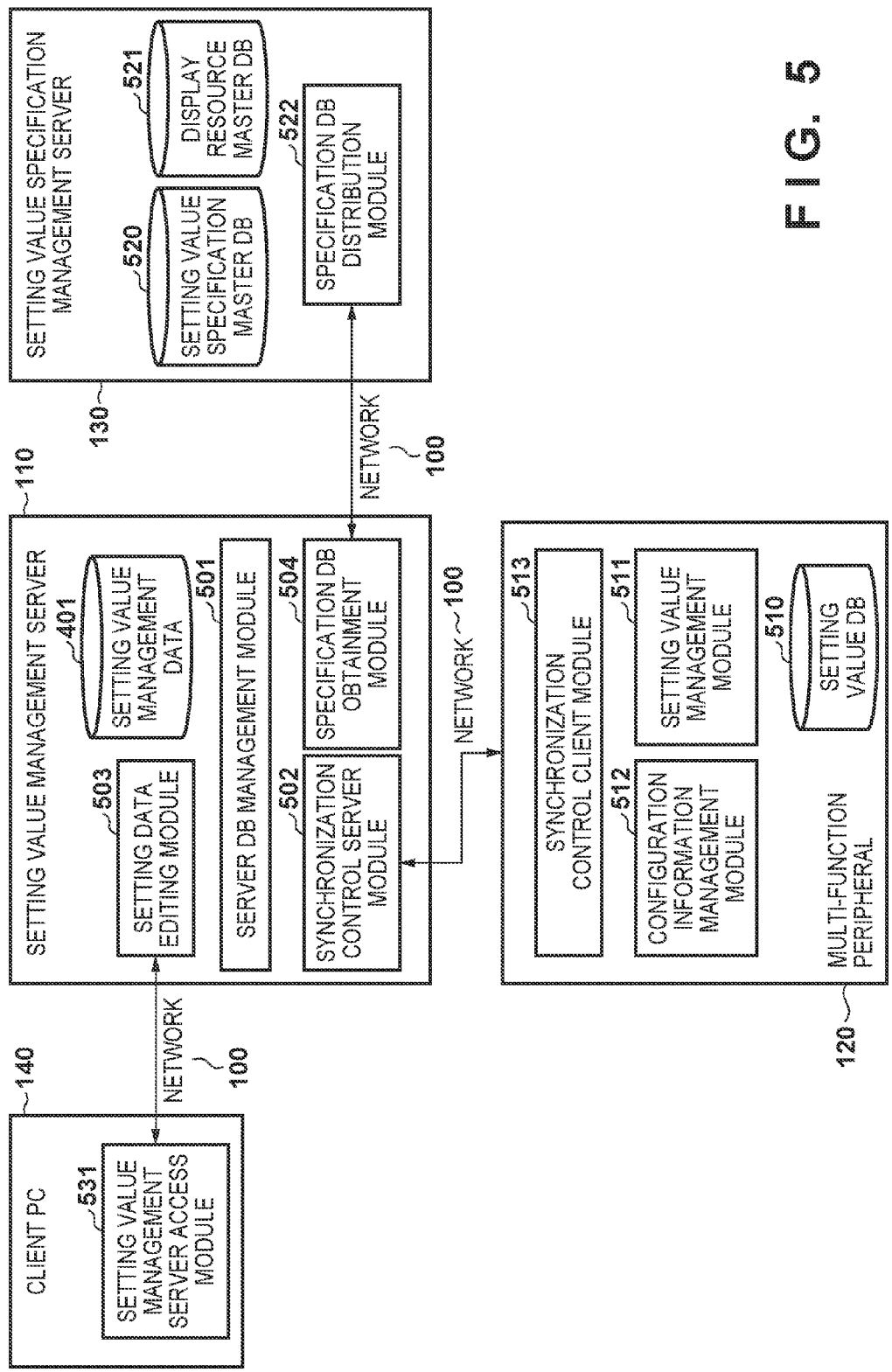
FIG. 5 is a view for illustrating a software configuration according to a first embodiment.

Next, referring to FIG. 5, explanation is given for a software configuration of the client PC 140, the setting value specification management server 130, a multi-function peripheral 120, and the setting value management server 110 according to the present embodiment. Each module is comprised by a CPU, a RAM, a ROM, an HDD, or the like.

The setting value management server 110 comprises a server DB management module 501, a synchronization control server module 502, a setting data editing module 503, and a specification DB obtainment module 504. The multifunction peripherals 120*a, b* comprise a setting value management module 511, a configuration information management module 512, a synchronization control client module 513, and a setting value DB 510. The setting value specification management server 130 comprises a setting value specification master DB 520, a display resource master DB 521, and a specification DB distribution module 522. The client PC 140 comprises a setting value management server access module 531.

The server DB management module 501 can edit all data of the setting value management data 401. The synchronization control server module 502 uses the network 100 to receive a change request or a data acquisition request from the client, and performs a read/write instruction with respect to the server DB management module 501. Meanwhile, in the multi-function peripheral 120, the setting value DB 510 is arranged, and reading/writing is performed via the setting value management module 511. All application programs that operate on the multi-function peripheral 120 use the setting value management module 511 to access data of the setting value DB 510.

The synchronization control client module 513 performs communication with the synchronization control server module 502 of the setting value management server 110 side via the network 100. In accordance with mainly periodic polling, operations to read a DB change on the server side into the multi-function peripheral side, or reflect an update of the setting value DB 510 on the multi-function peripheral side to the DB on the server side are performed. Work to reflect a change to the setting value DB 510 to the setting value management data 401 and a series of operations to detect a change to the setting value management data 401 and reflect it to the setting value DB 510 are positioned as synchronization control according to the present invention.

In the setting value specification management server 130 the setting value specification master DB 520 and the display resource master DB 521 are held, and required data can be read in accordance with an instruction of the specification DB distribution module 522. The specification DB obtainment module 504 of the setting value management server 110 accesses the specification DB distribution module 522 as necessary, and obtains necessary data. After the obtaining, the data is saved to the setting value editing-use display resource DB 411 or the setting value specification management DB 410 of the setting value management data 401 via the server DB management module 501.

The setting value management server access module 531 of the client PC 140 is a general tool for accessing a network server, such as a Web browser. The setting value management server access module 531 accesses the setting value management server 110 in accordance with reception of an operation from a user, uses a function of the setting data editing module 503 of the server side, and performs various setting change operations for a particular multi-function peripheral (image processing apparatus) based on an instruction by the user. The setting data editing module 503 updates the device-shared setting value DB 412, the device-specific setting value DB 414, or the like in the setting value management data 401 via the server DB management module 501.

Continuing on, a table will be used to give an explanation regarding an internal image of each data storage.

TABLE 1 setting value specification management DB 410

| Key identifier | Key display resource ID | Data type | Initial value | Value range | Value display resource ID | Activate condition |
|---|---|---|---|---|---|---|
| aaa_settings.bbb.xxx | ID_A/ID_B/ID_X | UNIT | 0 | 0 1 | ID_ON ID_OFF | Finisher X |
| aaa_settings.bbb.yyy | ID_A/ID_B/ID_Y | STRING | NULL | 255 | | |

Table 1 illustrates data stored in the setting value specification management DB 410. The setting value specification management DB 410 is a DB referenced when the setting data editing module 503 edits a setting value on the setting value management server 110. The setting value specification management DB 410 includes an identifier of a managed key, a data type, a value range, an ID of a display resource necessary to display the key, a resource ID for when an option is displayed, and a display condition (activate condition) for enabling an item of the option on the device. Because it is common for a number of key identifiers, the value range, the display language information, or the like to differ in accordance with the firmware version and model of the multi-function peripheral, this information (related information) has a different configuration depending on the model and the firmware version. In addition, information of the table for the DB 410 which is associated with all models and firmware versions already sold on the market is managed in the setting value specification master DB 520 in a centralized fashion, and is newly registered whenever a new model or a new firmware version is released.

TABLE 2 setting value editing-use display resource DB 411

| Resource ID | JP | EN |
|---|---|---|
| ID_A | Aの設定 | A Settings |
| ID_B | Bの設定 | B Settings |
| ID_C | Xを使用する | Use X |
| ID_D | Yの名前 | Y Name |
| ID_E | ON | On |
| ID_F | OFF | Off |

Table 2 illustrates data stored in the setting value editing-use display resource DB 411. The actual display language information linked to the resource ID stored in the setting value specification management DB 410 is stored for each different language. As an example here, only Japanese (JP) and English (EN) are described, but information of another language may be held. In addition, ID information that all models and firmware versions that are sold on the market are equipped with is registered in the display resource master DB 521. It is updated if a firmware version that includes a new language appears, or if language information of a new language is prepared.

TABLE 3 device-shared setting value DB 412

| Key identifier | Value |
|---|---|
| aaa_settings.bbb.xxx | 0 |
| ... | |
| ... | |

Table 3 shows data stored in the device-shared setting value DB 412. The device-shared setting value DB 412 is a database that manages setting values commonly used by all of the plurality of the multi-function peripheral 120 for which setting values are managed by the setting value management server 110. The device-shared setting value DB 412 stores key identifiers and values corresponding to the identifiers. The key identifiers are identifiers having the same system as the key identifiers for the setting value specification management DB 410.

TABLE 4 device-specific setting value DB 414

| Key identifier | Value |
|---|---|
| aaa_settings.bbb.yyy | test |
| ... | |
| ... | |

Table 4 shows data stored in the device-specific setting value DB 414. The device-specific setting value DB 414 is a database that manages setting values for values that differ in the plurality of the multi-function peripheral 120 for which setting values are managed by the setting value management server 110. Note that it is assumed that a plurality of the device-specific setting value DB 414 exists and correspond to individual multi-function peripherals. The device-specific setting value DB 414 stores key identifiers and values corresponding to the identifiers. The key identifiers are identifiers having the same system as the key identifiers for the setting value specification management DB 410.

TABLE 5 device configuration information management DB 415

| Attribute | Value |
|---|---|
| Device identifier | Device 1 |
| Model name | Model A |
| FirmVersion | 2.1 |
| License | Authentication |
| Accessory | FinisherX |

Table 5 shows details of device configuration information for each individual multi-function peripheral managed by the device configuration information management DB 415. The device configuration information management DB 415 is a database that stores and manages a plurality of sets of this device configuration information. The device configuration information includes a device identifier that identifies an individual multi-function peripheral, a model name, a firmware version, license information that represents a usable function, or the like. Note that the model name, the firmware version, the license or the like have the same system as the activate condition stored in the setting value specification management DB 410.

The registered device management DB 413 is a database for managing device identifiers of individual multi-function peripherals for which setting values are managed in the setting value management server 110. The setting value management server 110 can use each database of the setting value management data 401 to manage collectively each different setting value of the management target multi-function peripheral 120 or setting values common to all management target multi-function peripherals, and metadata of each setting value itself.

TABLE 6 setting value DB 510

| Key identifier | Value | Initial value | Value range | Display condition |
|---|---|---|---|---|
| aaa_settings.bbb.xxx | 1 | 0 | 0-1 | X license |
| aaa_settings.bbb.yyy | test | NULL | 0-255 | |
| ... | | | | |

Table 6 represents an example of a configuration of the setting value DB 510 stored in the HDD 305 of the multi-function peripheral 120 according to the present invention. The setting value DB 510 is a database that stores setting values used in the multi-function peripheral 120. The setting values stored in the setting value DB 510 are comprised from elements such as a key identifier for identifying the setting value, the setting value (current value), an initial value, a value range, and a display condition. These elements are managed by the same system as for those managed in the setting value management data 401. When a setting value is changed in the setting value management server 110 or the multi-function peripheral 120, the setting value is synchronized by communicating at least the key identifier and the value thereof from the data shown in the setting value DB 510.

<Synchronization Processing>

Figure 6:
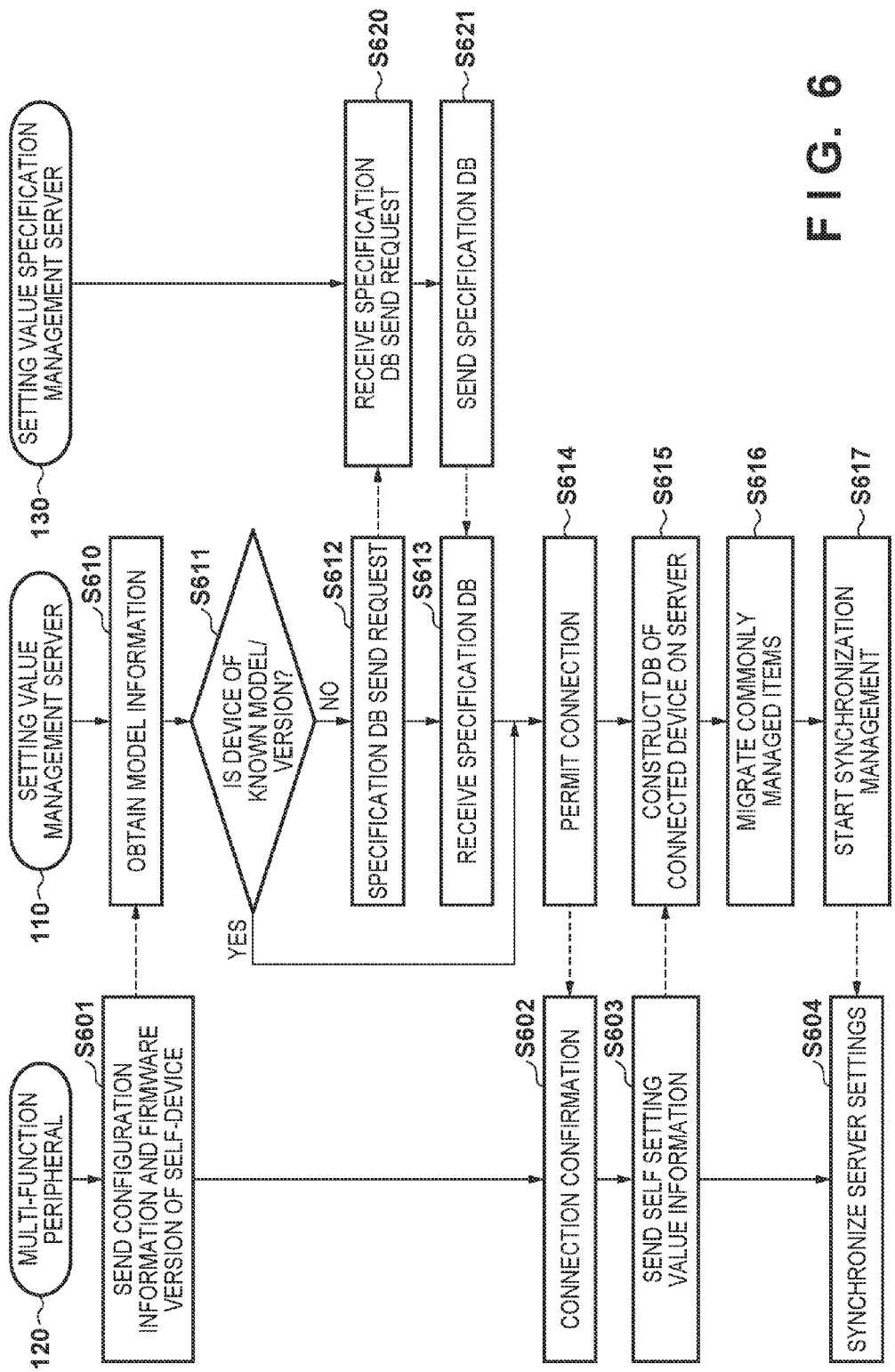
FIG. 6 is a flowchart for obtaining a specification DB according to the first embodiment.

Next, with reference to FIG. 6, in the present embodiment, explanation is given of a processing procedure in which the setting value management server 110 obtains the setting value specification management DB 410 from the setting value specification management server 130, in a state in which a system for comprehensively managing and synchronizing setting values is functioning. Here, explanation is given of a flow for a case in which the setting value management server 110 has already started a service, and the multi-function peripheral 120 starts a connection with respect to the service, or for a re-connection performed due to a version update of the firmware of the multi-function peripheral 120 which is connected. Note that, here, explanation is given regarding control when the multi-function peripheral 120 newly connects to the setting value management server 110, but synchronization (step S604 and step S617) of setting value information or the like is performed in accordance with similar control when the a setting value is changed in the setting value management server 110 or the multi-function peripheral 120 as well. This synchronization may be performed if there is a change after periodically confirming whether there has been a change, or may be performed at timing notified to the setting value management server 110 when a change has occurred. Processing explained below is realized by control programs stored in a storage unit of one of the RAM, the ROM, and the HDD, of each apparatus being read and executed by the respective CPU.

Firstly, explanation is given for operation of the multi-function peripheral 120, which is the client. In step S601, the synchronization control client module 513 of the multi-function peripheral 120 transmits a connection request to the synchronization control server module 502 of the setting value management server 110 along with its (self-device) model code, firmware version, and device configuration information, such as that for hardware or a license. In step S602, the synchronization control client module 513 receives a connection confirmation from the synchronization control server module 502. Continuing on, in step S603 the synchronization control client module 513 transmits a complete set of its (self-device) current settings information to the setting value management server 110. Thereafter, when self-device settings synchronization is started by the setting value management server 110, the processing proceeds to step S604, and initial synchronization of data is performed. Thereafter, if an arrangement for synchronizing the setting values in accordance with an operation of the synchronization control client module 513 functions and the setting values are edited on the multi-function peripheral 120 or the setting value management server 110, an arrangement of immediate synchronization operates.

Next, explanation is given for operation of the setting value management server 110. In step S610, client information from the synchronization control client module 513 is received. In step S611, the synchronization control server module 502 queries the server DB management module 501. Whether the setting value management data 401 holds the corresponding model and the firmware version is confirmed. As a result of the confirming, if the client information is known the processing proceeds to step S614, and if it is an unknown client multi-function peripheral, the processing proceeds to step S612.

In step S612, the specification DB obtainment module 504 requests the specification DB distribution module 522 of the setting value specification management server 130 to obtain a specification DB of the corresponding model and version. In step S613, upon receiving a necessary specification DB, the specification DB obtainment module 504 thereby enters a state of being able to manage the settings of the connected client. Thereafter, the processing proceeds to step S614.

In step S614 the synchronization control server module 502 instructs the synchronization control client module 513 to permit connecting. Upon receiving this, the synchronization control client module 513 transmits the current setting status of the setting value DB 510 of the client multi-function peripheral 120. When transmitted, in step S615 the synchronization control server module 502 saves the corresponding client information in the setting value management data 401 of the setting value management server 110.

In step S616, the server DB management module 501 compares the obtained new specification DB and items already commonly managed currently, and if necessary performs data migration. Here, data migration indicates an update process, such as processing for removal from a common management target when items commonly managed comprehensively fall under operation of a new specification for data (value range, type of data, etc.) that is different to other models/versions, due to a new connection or a version update.

When the above is completed synchronization management is started in step S617. Thereafter, if a change is applied to the setting value DB 510 of the multi-function peripheral 120 or if any of the setting value management data 401 on the setting value management server is changed, an operation to immediately synchronize is started.

Finally, explanation is given for operation of the setting value specification management server 130. Upon receiving a request from the specification DB obtainment module 504, in step S620, the specification DB distribution module 522 retrieves from the setting value specification master DB 520 the specification DB of the model and version for which the request was received, and the processing proceeds to step S621. In step S621, the specification DB distribution module 522 transmits the corresponding specification DB. The transmitted specification DB is, as described above, obtained by the specification DB obtainment module 504 in step S613.

<Screen Generation Processing>

Figure 7:
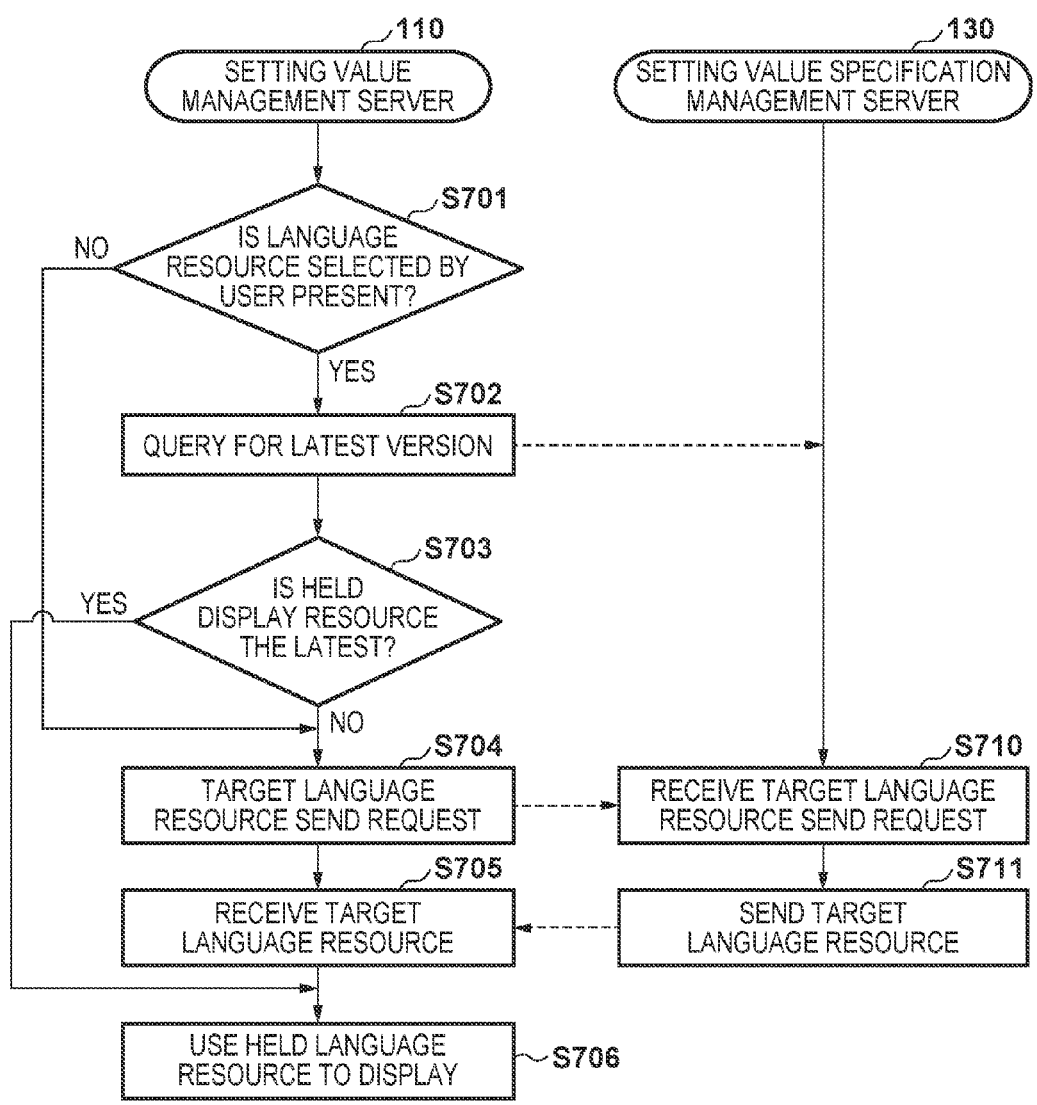
FIG. 7 is a flowchart for obtaining a display resource according to first and second embodiments.

Next, with reference to FIG. 7, explanation is given for processing in which the setting value management server access module 531 on the client PC 140 receives an instruction from a user, accesses the setting data editing module 503, and generates a screen when the actual setting value is to be edited. Here, explanation is given for a series of flows in which the setting data editing module 503 on the setting value management server 110 receives the request from the setting value management server access module 531 until generation of a screen is performed. Note that processing explained below is realized by a control program stored in a storage unit of one of the RAM, the ROM, and the HDD, of each apparatus being read and executed by the respective CPU.

In step S701, upon receiving a display instruction, the setting data editing module 503 determines whether a selected language resource is present in the setting value editing-use display resource DB 411. If not present, the processing proceeds to step S704. If present, the processing proceeds to step S702 and the setting data editing module 503 obtains, via the specification DB obtainment module 504, a latest state of a corresponding language held in the display resource master DB 521 in the form of version or last update date/time information, or the like.

Next, in step S703, the setting data editing module 503 compares a state of the setting value editing-use display resource DB 411 and the obtained display resource information, and if it can be confirmed that they are the same the processing proceeds to step S706. If the display resource master DB 521 can be confirmed as newer or the corresponding language resource in step S701 is not held, the processing proceeds to step S704. The display resource is not just information linked to a model and firmware version, and only one type is held at all times. However, because there is a need to track and update language data when the number of setting items or the like increases due to a new model or the like, in this way, it is necessary to determine whether it is the latest version.

In step S704, the specification DB obtainment module 504 requests transmission of a latest resource, and in step S705 the transmission is received from the setting value specification management server 130. Thereby, it is possible to obtain the latest resource necessary for display. Accordingly, in step S706 the setting data editing module 503 can generate and display a screen in accordance with the request of the setting value management server access module 531.

Explanation is given for operation of the specification DB distribution module 522. In step S710, the specification DB distribution module 522, as described above, receives the request to obtain the language resource from the specification DB obtainment module 504 of the setting value management server 110. Continuing on, in step S711, the specification DB distribution module 522 transmits a required language resource to the setting value management server 110.

<Editing Screen>

Figure 8:
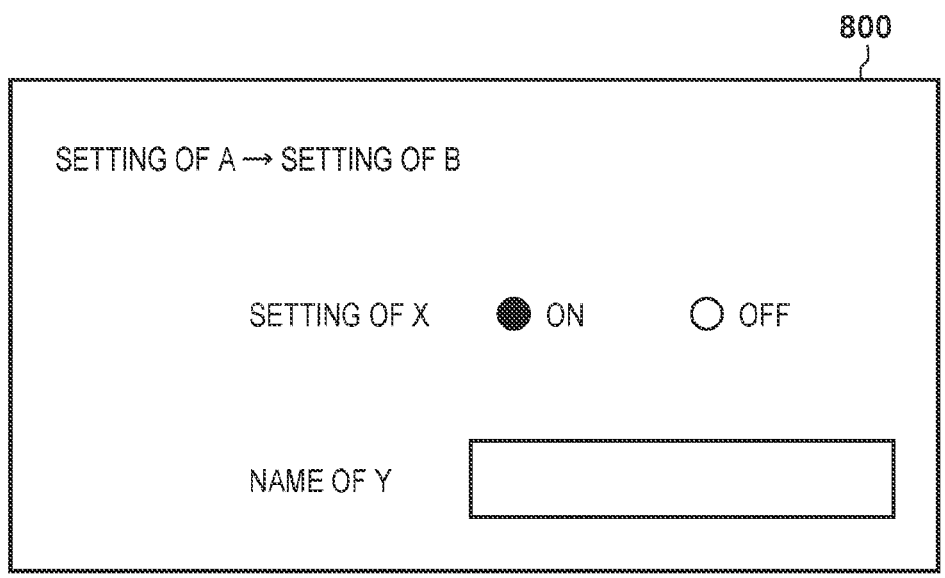
FIG. 8 is a view for illustrating an automatically generated editing screen according to the first and second embodiments.

Next, referring to FIG. 8, explanation is given for an editing screen that the setting data editing module 503 generated based on the request of the setting value management server access module 531. When information of the table for the DB 410 is held in the setting value specification management DB 410, information of the table for the DB 411 is held in the setting value editing-use display resource DB 411, and Japanese is selected as the display language, it is possible to automatically display an editing screen as in a screen 800. Here, the setting data editing module 503 is an example of a display control unit. As explained by using the flowcharts shown in FIG. 6 and FIG. 7, to obtain the specification DB in accordance with the model or version of the corresponding multi-function peripheral and to obtain the necessary language, this screen is automatically generated, and it is possible to edit data. It is also possible to control an item that should not be displayed in accordance with an activate condition held by the setting value specification management DB 410 and configuration information obtained beforehand.

Thereby, without directly accessing the multi-function peripheral 120, the user can edit the device-shared setting value DB 412 or the device-specific setting value DB 414 through this screen and edit the setting value DB 510 through synchronization control. Furthermore, for image processing apparatuses of all models and firmware versions present on the market that can be managed by a server, a setting value specification is managed by using an external apparatus (the setting value specification management server 130), and used by a setting value editing application of the setting value management server 110. Thereby, it is possible for settings of an image processing apparatus that is a client to be edited by an external unit (the setting value management server 110). In other words, by virtue of the present embodiment, it is possible to use another apparatus to manage setting values of a client without managing comprehensively by one server (the setting value management server 110). Furthermore, by using the managed information, it is possible to perform editing of setting values of the client from the server (the setting value management server 110).

Second Embodiment

Explanation is given below of a second embodiment of the present invention using FIG. 9 and FIG. 10. In the above described first embodiment, the setting value management server 110 was explained with a configuration that is constantly connected by a network to the client multi-function peripheral 120 and synchronizes settings data in real-time. However, in the present embodiment, explanation is given for a configuration that saves settings data in a format that can be imported to the multi-function peripheral 120, and distributes the settings data to the multi-function peripheral 120 at another time. The fundamental configuration does not change from the above described first embodiment—explanation is given mainly for differences.

<Software Configuration>

Figure 9:
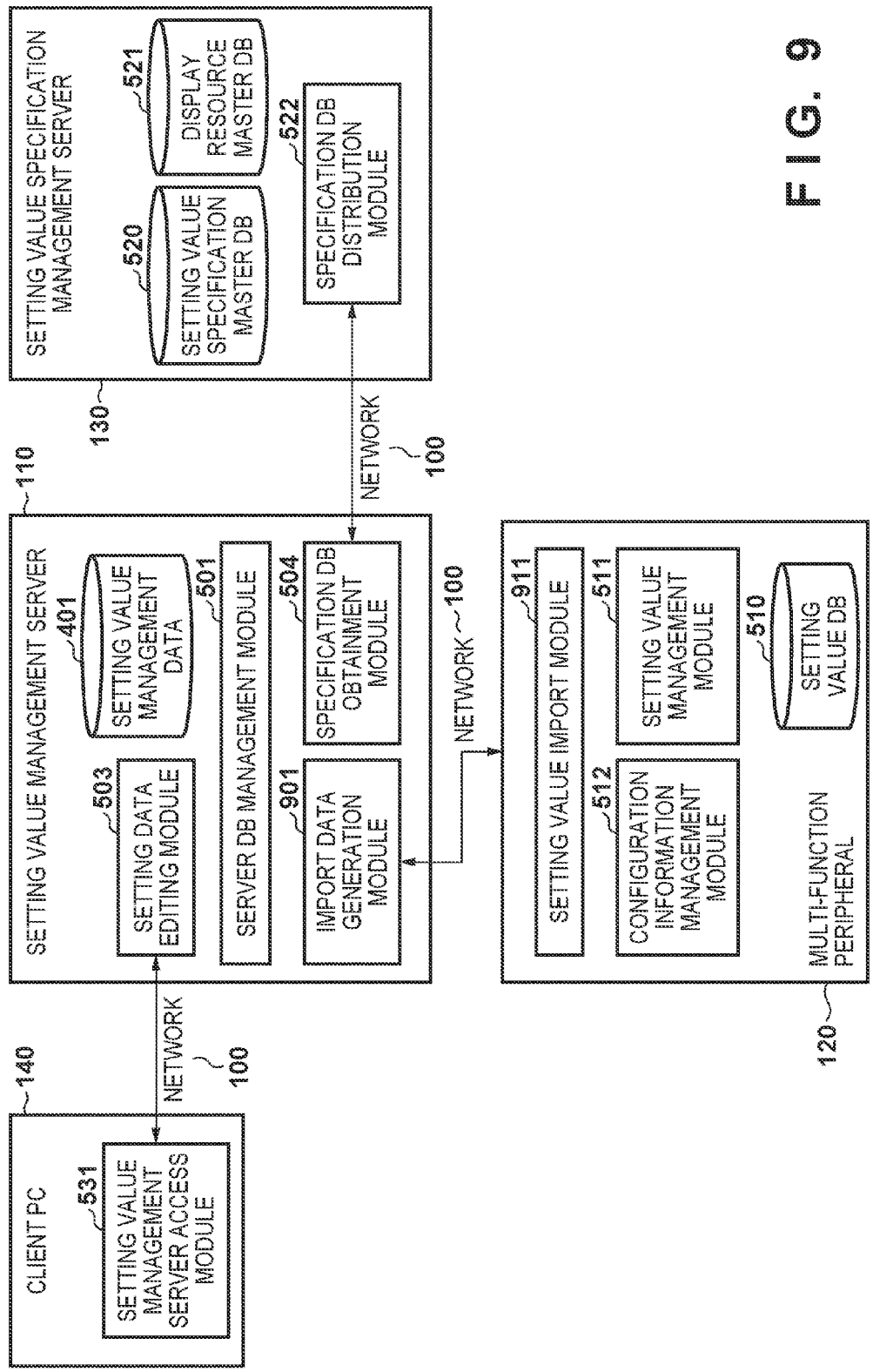
FIG. 9 is a view for illustrating a software configuration according to the second embodiment.

With reference to FIG. 9, explanation is given for a software configuration according to the present embodiment. The synchronization control client module 513 and the synchronization control server module 502, which are software modules that synchronize setting values as illustrated in FIG. 5, are not present. Instead, an import data generation module 901 is included in the setting value management server 110, and a setting value import module 911 is included in the multi-function peripheral 120. Because other blocks are the same as the above described first embodiment, explanation thereof is omitted.

The import data generation module 901 converts editable data for the version and model for which editing is performed that is saved in the device-specific setting value DB 414 into a format that can be imported into a device. The setting value import module 911 provided in the multi-function peripheral 120 obtains import data generated by the import data generation module 901, and reflects it to the setting value DB 510. The setting value import module 911 may obtain the import data in accordance with a notification from the setting value management server 110, or may periodically access the setting value management server 110 and obtain the import data if it is present. The setting value import module 911 may access the setting value management server 110 and obtain the import data based on a user instruction. Configuration may be taken such that the import data generated by the import data generation module 901 is stored on a portable medium, such a USB memory, and the import module 911 obtains the import data from the portable medium. In other words, the multi-function peripheral 120 can obtain the generated import data at any time.

<Processing Procedure>

Figure 10:
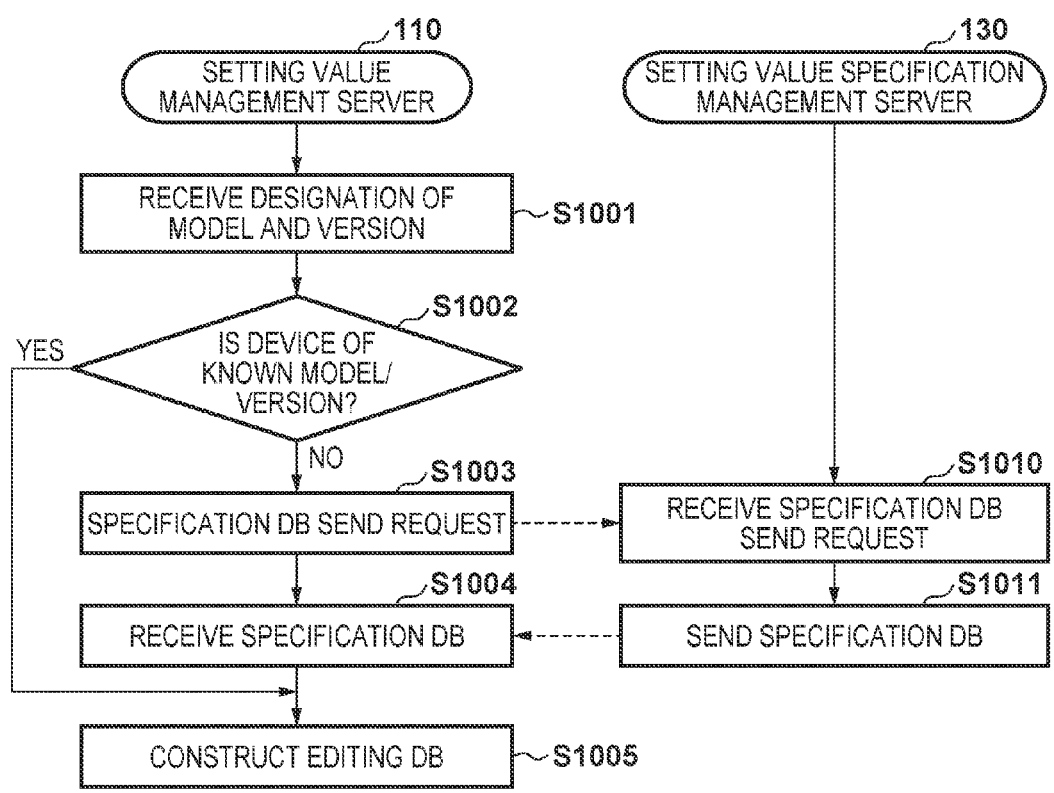
FIG. 10 is a flowchart for obtaining a specification DB according to the second embodiment.

Next, with reference to FIG. 10, explanation is given for a processing procedure according to the present embodiment. Note that processing explained below is realized by a control program stored in a storage unit of one of the RAM, the ROM, and the HDD, of each apparatus being read and executed by the respective CPU.

When a user accesses the setting data editing module 503 through the setting value management server access module 531, they firstly input a model and a firmware version to be edited. In addition, they input configuration information planned to be configured such as for hardware, a license, or the like.

In step S1001, the setting data editing module 503 receives the input information described above. In step S1002, the setting data editing module 503 confirms whether a DB of the input model and firmware version is present in the setting value specification management DB 410 of the setting value management data 401. If present the processing proceeds to step S1005, and if not present the processing proceeds to step S1003. In step S1003, the specification DB obtainment module 504 outputs a request to obtain the corresponding specification DB to the setting value specification management server 130, and this is received in step S1004. Thereby, with reference to the obtained the specification DB, in step S1005 the setting data editing module 503 saves editable data for the model and version to be edited in the device-specific setting value DB 414.

Continuing on, explanation is given for operation of the setting value specification management server 130. In step S1010, upon receiving the request from the specification DB obtainment module 504, the specification DB distribution module 522 retrieves from the setting value specification master DB 520 the specification DB of the model and version that received the request, and the processing proceeds to step S1011. In step S1011, the specification DB distribution module 522 transmits the retrieved specification DB to the setting value management server 110.

In this way, by virtue of the present embodiment, in a case where a user edits the settings of the multi-function peripheral 120 via the setting value management server access module 531, the model name and the firmware version are designated. Thereby, the setting value management server 110 can obtain a specification DB necessary for editing from the setting value specification management server 130. In other words, it is not necessary to manage the information comprehensively on the setting value management server 110, and management can be performed by distributing the information to another server or the like.

Further processing obtains a language resource and presents an editable screen similarly to in the sequence explained in the above above-described first embodiment using FIG. 7. Thereby, it is possible to edit necessary settings data without logging in to the corresponding multi-function peripheral 120 main body. It is possible to narrow down items to be edited from the activate condition of the setting value specification management DB 410 and manually inputted configuration information.

Data that is edited and saved in the device-specific setting value DB 414 is converted by the import data generation module 901 to a format that can be imported by the device. It is common for the data format to be XML or the like. The import data generated in this way is passed to the setting value import module 911 of the multi-function peripheral 120. Importing may be performed via a network, or the data may be read after connecting a portable medium. Thereafter, by reflecting in the setting value DB 510 via the setting value management module 511, it is possible to reflect a setting value generated and held in advance by automatically inserting it into the multi-function peripheral 120.

By virtue of the above embodiments it is possible to suitably manage setting values or the like of a client, and to use the managed information to perform editing of the setting values or the like of the client from a server.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-251073, filed Dec. 11, 2014, which is hereby incorporated by reference herein in its entirety.

What is claimed is:

1. An information processing apparatus comprising:
a storage configured to store, in association with configuration information of an image processing apparatus as a client, specification information used to determine settings information that is used for an operation of the image processing apparatus and is to be shared between the information processing apparatus and the image processing apparatus;
a processor; and
a memory having stored thereon instructions that when executed by the processor, cause the processor to:
obtain the configuration information of the image processing apparatus;
receive, in a case where specification information corresponding to the obtained configuration information is not stored in the storage, the specification information corresponding to the obtained configuration information from an external storage device;
generate, based on the received specification information, an editing screen for editing the settings information of the client;
display the generated editing screen; and
transmit to the image processing apparatus settings information to be shared with the image processing apparatus, which is set by an operator of the information processing apparatus by using the generated editing screen, thereby causing the image processing apparatus to synchronize settings information of the image processing apparatus with the transmitted settings information,
wherein the specification information indicates a value range of settings information of the client, the value range varying depending on a configuration of the client, and
wherein the configuration information includes at least a model name or a firmware version of the client.

2. The information processing apparatus according to claim 1, wherein:
when a setting value stored in the storage is edited via the editing screen, the edited setting value is transmitted to the image processing apparatus.

3. The information processing apparatus according to claim 1, further comprising instructions stored on the memory that, when executed by the processor, cause the processor to:
determine, in a case where the storage stores the specification information corresponding to the obtained configuration information, the settings information to be shared with the image processing apparatus based on the specification information stored by the storage.

4. The information processing apparatus according to claim 1, wherein
the configuration information is obtained from the image processing apparatus or is obtained according to a user input into the information processing apparatus.

5. The information processing apparatus according to claim 1, further comprising instructions stored on the memory that, when executed by the processor, cause the processor to:
store a resource for generating the editing screen; and
obtain version information of the specification information, wherein
in a case where a resource corresponding to the obtained version information is not stored, the corresponding resource is received from the external storage device, and
the resource received from the external storage device is used to generate the editing screen.

6. The information processing apparatus according to claim 5, wherein
the resource is a language resource for generating the editing screen.

7. The information processing apparatus according to claim 1, wherein
the specification information is obtained from the image processing apparatus in accordance with the image processing apparatus being connected to the information processing apparatus.

8. A method for controlling an information processing apparatus, the method comprising:
storing in a storage, in association with configuration information of an image processing apparatus as a client, specification information used to determine settings information that is used for an operation of the image processing apparatus and is to be shared between the information processing apparatus and the image processing apparatus;
obtaining the configuration information of the image processing apparatus;
receiving, in a case where specification information corresponding to the obtained configuration information is not stored in the storage, the specification information corresponding to the obtained configuration information from an external storage device;
generating, based on the received specification information, an editing screen for editing the settings information of the client;
displaying the generated editing screen; and
transmitting to the image processing apparatus settings information to be shared with the image processing apparatus, which is set by an operator of the information processing apparatus by using the generated editing screen, thereby causing the image processing apparatus to synchronize settings information of the image processing apparatus with the transmitted settings information,
wherein the specification information indicates a value range of settings information of the client, the value range varying depending on a configuration of the client, and
wherein the configuration information includes at least a model name or a firmware version of the client.

9. The method for controlling according to claim 8, wherein
when a setting value stored in the storage is edited via the editing screen, the edited setting value is transmitted to the image processing apparatus.

10. The method according to claim 8, further comprising:
determining, in a case where the storage stores the specification information corresponding to the obtained configuration information, the settings information to be shared with the image processing apparatus based on the specification information stored by the storage.

11. The method for controlling according to claim 8, wherein
the configuration information is obtained from the image processing apparatus or is obtained according to a user input into the information processing apparatus.

12. The method according to claim 8, further comprising:
storing a resource for generating the editing screen; and
obtaining version information of the specification information,
wherein
in a case where a resource corresponding to the obtained version information is not stored, the corresponding resource is received from the external storage device, and
the editing screen is generated using the resource received from the external storage device.

13. A non-transitory computer readable storage medium storing a program for causing a computer to execute a method, the method comprising:
storing in a storage, in association with configuration information of an image processing apparatus as a client, specification information used to determine settings information that is used for an operation of the image processing apparatus and is to be shared between the computer and the image processing apparatus;
obtaining the configuration information of the image processing apparatus;
receiving, in a case where specification information corresponding to the obtained configuration information is not stored in the storage, the specification information corresponding to the obtained configuration information from an external storage device;
generating, based on the received specification information, an editing screen for editing the settings information of the client;
displaying the generated editing screen; and
transmitting to the image processing apparatus settings information to be shared with the image processing apparatus, which is set by an operator of the information processing apparatus by using the generated editing screen, thereby causing the image processing apparatus to synchronize settings information of the image processing apparatus with the transmitted settings information,
wherein the specification information indicates a value range of settings information of the client, the value range varying depending on a configuration of the client, and
wherein the configuration information includes at least a model name or a firmware version of the client.

* * * * *